(12) United States Patent
Hama et al.

(10) Patent No.: US 8,114,552 B2
(45) Date of Patent: Feb. 14, 2012

(54) ELECTRODE STRUCTURE FOR POLYMER ELECTROLYTE FUEL CELL COMPRISING SULFONATED POLYARYLENE-BASED POLYMER AND METHOD FOR MANUFACTUING SAME

(75) Inventors: Yuichiro Hama, Wako (JP); Masaru Iguchi, Wako (JP); Junichi Yano, Wako (JP); Nagayuki Kanaoka, Wako (JP); Naoki Mitsuta, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 999 days.

(21) Appl. No.: 11/723,436

(22) Filed: Mar. 20, 2007

(65) Prior Publication Data
US 2007/0166594 A1 Jul. 19, 2007

Related U.S. Application Data

(62) Division of application No. 10/713,146, filed on Nov. 17, 2003, now abandoned.

(30) Foreign Application Priority Data

| Nov. 18, 2002 | (JP) | 2002-333566 |
| Nov. 18, 2002 | (JP) | 2002-334302 |
| Oct. 31, 2003 | (JP) | 2003-371834 |
| Oct. 31, 2003 | (JP) | 2003-371835 |

(51) Int. Cl.
H01M 8/10 (2006.01)
(52) U.S. Cl. ........... 429/493; 429/491; 429/492; 521/27
(58) Field of Classification Search .................. None
See application file for complete search history.

(56) References Cited

U.S. PATENT DOCUMENTS 6,096,856 A 8/2000 Helmer-Metzmann et al.
6,926,984 B2 8/2005 Asano et al.
2002/0164513 A1* 11/2002 Asano et al. ................... 429/32
2004/0044166 A1* 3/2004 Rozhanskii et al. ............ 528/86

FOREIGN PATENT DOCUMENTS
JP 2000-090944 A 3/2000
(Continued)

OTHER PUBLICATIONS
Japanese Office Action, dated Oct. 2, 2008, issued in the corresponding Japanese Application No. 2003-371834.

*Primary Examiner* — Ula C Ruddock
*Assistant Examiner* — Tony Chuo
(74) *Attorney, Agent, or Firm* — Arent Fox LLP (57) ABSTRACT

There is provided an electrode structure for a polymer electrolyte fuel cell having excellent power generation performance and excellent durability and a method for manufacturing the same. Also provided is a polymer electrolyte fuel cell including the electrode structure and an electrical apparatus and a transport apparatus using the polymer electrolyte fuel cell. The electrode structure includes a polymer electrolyte membrane 2 sandwiched between a pair of electrode catalyst layers 1, 1 containing carbon particles supporting catalyst particles. The polymer electrolyte membrane 2 is made of a sulfonated polyarylene-based polymer. The sulfonated polyarylene-based polymer has an ion exchange capacity in the range of 1.7 to 2.3 meq/g, and the polymer contains a component insoluble in N-methylpyrrolidone in an amount of 70% or less relative to the total amount of the polymer, after the polymer is subjected to heat treatment for exposing it under a constant temperature atmosphere of 12° C. for 200 hours. A catalyst paste containing catalyst particles and a polymer electrolyte is coated on a sheet-like support 6 and dried to form an electrode catalyst layer 1 containing a solvent in an amount in the range of 0.5% or less by weight of the total membrane. The electrode catalyst layers 3, 3 are thermally transferred and joined on both sides of the polymer electrolyte membrane 1.

2 Claims, 3 Drawing Sheets

FOREIGN PATENT DOCUMENTS

| JP | 2000-223136 | | 8/2000 |
| JP | 2002-216797 | A | 8/2002 |
| JP | 2002-298858 | A | 10/2002 |
| JP | 2002-298869 | A | 10/2002 |

* cited by examiner

FIG. 3

FIG. 4

ELECTRODE STRUCTURE FOR POLYMER ELECTROLYTE FUEL CELL COMPRISING SULFONATED POLYARYLENE-BASED POLYMER AND METHOD FOR MANUFACTUING SAME

This is a Divisional Application which claims the benefit of U.S. patent application Ser. No. 10/713,146, filed Nov. 17, 2003, now abandoned, which also claims the benefit of priority from Japanese Patent Application Nos. 2002-333566 filed Nov. 18, 2002; 2002-334302 filed Nov. 18, 2002; 2003-371834 filed Oct. 31, 2003; and 2003-371835 filed Oct. 31, 2003. The disclosures of the prior applications are hereby incorporated herein in their entirety by reference.

BACKGROUND OF THE INVENTION

1. Field of the Invention

The present invention relates to an electrode structure for a polymer electrolyte fuel cell and a method for manufacturing the same.

2. Description of the Related Art

Petroleum resources are going to be exhausted, and at the same time environmental issues such as global warming due to the consumption of fossil fuels are becoming more critical. Thus, as a clean power source for an electric motor that is not associated with the generation of carbon dioxide, a fuel cell has attracted attention, has been developed extensively, and has become commercially practical in some applications. When the fuel cell is mounted on a vehicle and the like, a polymer electrolyte fuel cell using a polymer electrolyte membrane is suitably used because high voltage and a large current are readily obtained.

There is known an electrode structure for use in the polymer electrolyte fuel cell comprising a pair of electrode catalyst layers which is formed by supporting a catalyst such as platinum on a catalyst carrier such as carbon black and being integrated by an ion conducting polymer binder, wherein an ion-conducting polymer electrolyte membrane is sandwiched between the both electrode catalyst layers and a diffusion layer is laminated on each of the electrode catalyst layers (Refer to, for example, Japanese Patent Laid-Open No. 2000-223136). The electrode structure can compose a polymer electrolyte fuel cell by further laminating a separator, which also serves as a gas channel, on each diffusion layer.

In the polymer electrolyte fuel cell, one of the electrode catalyst layers is used as a fuel electrode, into which a reducing gas such as hydrogen or methanol is introduced through the diffusion layer, and the other electrode catalyst layer is used as an oxygen electrode, into which an oxidizing gas such as air or oxygen is introduced through the diffusion layer. In this way, at the fuel electrode side, the catalyst contained in the electrode catalyst layer acts to produce protons from the reducing gas, and the protons move through the polymer electrolyte membrane to the electrode catalyst layer at the oxygen electrode side. Further, the protons react with the oxidizing gas introduced into the oxygen electrode side to produce water in the electrode catalyst layer at the oxygen electrode by the action of the catalyst contained in the electrode catalyst layer. Consequently, the polymer electrolyte fuel cell can provide current by connecting the fuel electrode to the oxygen electrode with a lead wire.

Conventionally, in the electrode structure, perfluoroalkylenesulfonic acid polymer compound (e.g., Nafion (trade name) made by E.I. du Pont de Nemours and Company) has been widely utilized as the polymer electrolyte membrane. The perfluoroalkylenesulfonic acid polymer compound has excellent proton conducting properties as it is sulfonated and also has chemical resistance as a fluoropolymer, but has a problem that it is very expensive.

Therefore, it has been studied to compose an electrode structure for a polymer electrolyte fuel cell using a less expensive ion-conducting material as an alternative to perfluoroalkylenesulfonic acid polymer compound. For example, a sulfonated polyarylene-based polymer is known as the less expensive ion-conducting material.

However, the electrode structure using the polymer electrolyte membrane made of the sulfonated polyarylene-based polymer has the problem of degradation of the polymer electrolyte membrane by the heat during operation, when composing a fuel cell, causing to mix the gases introduced into the fuel electrode and oxygen electrode sides and to develop cross-leak in which the poles are short-circuited.

Conventionally, the electrode structure has been produced, for example, as described below. First, a polymer electrolyte membrane is formed by a casting method from a solution prepared by dissolving the sulfonated polyarylene-based polymer in a solvent such as N-methylpyrrolidone.

Catalyst particles in which platinum particles are supported on carbon particles are dispersed in the polymer electrolyte solution to prepare a catalyst paste containing the catalyst particles and the polymer electrolyte. The catalyst paste is coated on a sheet-like support such as a polyethylene terephthalate film and dried to form an electrode catalyst layer.

Then, the both sides of the polymer electrolyte membrane are sandwiched between the electrode catalyst layers and maintained at the temperature ranging from 80 to 160° C. After the polymer electrolyte membrane and the polymer electrolyte contained in the electrode catalyst layers are softened, they are maintained under a pressure in the range of 1 to 10 MPa for 1 to 60 minutes. As a result, the electrode catalyst layers are transferred to the polymer electrolyte membrane from the polyethylene terephthalate film to be joined to the polymer electrolyte membrane by thermocompression bonding.

Then, the electrode catalyst layers at the both sides are sandwiched between diffusion layers and subjected to hot press. Thereby, the diffusion layers are joined to each of the electrode catalyst layers to form an electrode structure.

However, the electrode structure produced by the conventional production method has a problem that it has large change in dimensions.

SUMMARY OF THE INVENTION

It is an object of the present invention to provide an electrode structure for a polymer electrolyte fuel cell having excellent power generation performance and excellent durability to the heat during the operation of a fuel cell.

Another object of the present invention is to provide a method for producing the electrode structure for a polymer electrolyte fuel cell.

A further object of the present invention is to provide a method in which the electrode structure for a polymer electrolyte fuel cell having excellent dimensional stability can be produced.

A polyarylene-based polymer can be provided with an ion exchange function by sulfonation. A greater number of sulfonic acid groups to be introduced into the polymer provides larger ion exchange capacity. On the other hand, the greater number of sulfonic acid groups causes the polymer to be more easily degraded by heat.

The inventors have studied the sulfonated polyarylene-based polymer, and have found that when the number of the introduced sulfonic acid groups is large, an intermolecular crosslinking reaction occurs by the sulfonic acid groups upon heating, resulting in the formation of a component insoluble in a solvent such as N-methylpyrrolidone. The inventors have further studied based upon the above knowledge, and have attained the present invention by finding that the amount of the component insoluble in the solvent affects the toughness of the polymer electrolyte membrane made of the sulfonated polyarylene-based polymer, and that the reduction of toughness is related to the power generation performance of a fuel cell and the durability to the heat during the operation of the fuel cell.

Thus, for achieving these objects, an electrode structure for a polymer electrolyte fuel cell of the present invention comprises a pair of electrode catalyst layers containing carbon particles supporting platinum particles as a catalyst and a polymer electrolyte membrane sandwiched between the electrode catalyst layers, wherein the polymer electrolyte membrane is made of a sulfonated polyarylene-based polymer; the sulfonated polyarylene-based polymer has an ion exchange capacity in the range of 1.7 to 2.3 meq/g; and the polymer contains a component insoluble in N-methylpyrrolidone in an amount of 70% or less relative to the total amount of the polymer, after the polymer is subjected to heat treatment for exposing the same under a constant temperature atmosphere of 120° C. for 200 hours.

The content of the insoluble component can be calculated by determining elution curves from gel permeation chromatographs for an untreated polymer electrolyte membrane and the polymer electrolyte membrane after subjected to the treatment for exposing it under a constant temperature atmosphere of 120° C. for 200 hours and by determining the ratio of the areas of these elution curves (the area of the elution curve for the untreated polymer electrolyte membrane is defined as 100).

The electrode structure for a polymer electrolyte fuel cell of the present invention can provide excellent power generation performance and excellent durability to the heat during the operation of the fuel cell, when the sulfonated polyarylene-based polymer has the ion exchange capacity in the above-described range, and the polymer contains a component insoluble in N-methylpyrrolidone in an amount in the range described above after the polymer is subjected to the above-described heat treatment.

In the present specification, a "sulfonated polyarylene-based polymer" refers to a sulfonated product of a polymer having the structure of the formula:

(wherein —X— denotes a single bond or a divalent organic group; —W— denotes a divalent electron attractive group; —T— denotes a divalent organic group; $R^1$ to $R^8$ each denotes a fluorine atom, a hydrogen atom, an alkyl group, an aryl group or an allyl group, and each independently may be the same or different; p is 0.5 to 100; q is 99.5 to 0; r is an integer of 0 to 10; and s is an integer of 1 to 100)

The divalent organic groups may include electron attractive groups such as —CO—, —CONH—, —$(CF_2)_p$— (p is an integer of 1 to 10), —$C(CF_3)_2$—, —COO—, —SO—, and —$SO_2$—; groups such as —O—, —S—, —CH=CH—, and —C≡C—; and electron donative groups represented by the formula:

The divalent electron attractive groups may include groups such as —CO—, —CONH—, —$(CF_2)_p$— (p is an integer of 1 to 10), —$C(CF_3)_2$—, —COO—, —SO—, and —$SO_2$—.

The electrode structure for a polymer electrolyte fuel cell of the present invention cannot provide sufficient power generation performance, if the ion exchange capacity of the sulfonated polyarylene-based polymer is less than 1.7 meq/g. In addition, it cannot provide sufficient durability to the heat during the operation of the fuel cell, if the ion exchange capacity of the sulfonated polyarylene-based polymer is more than 2.3 meq/g, and the polymer contains a component insoluble in N-methylpyrrolidone in an amount of more than 70% relative to the total amount of the polymer, after the polymer is subjected to the above-described heat treatment.

In the electrode structure for a polymer electrolyte fuel cell of the present invention, when the ion exchange capacity is in the above-described range, the sulfonated polyarylene-based polymer is preferably, for example, a sulfonated product of a copolymer represented by formula (1) or a copolymer represented by formula (2), in order to bring the content of the insoluble component after the heat treatment into the above-described range:

Moreover, the inventors have diligently studied the reason why the change of dimensions is increased when a polymer electrolyte fuel cell is formed from the electrode structure produced by the conventional production method. As a result, it has been found that, in the conventional production method, the solvent, which is contained in a polymer electrolyte membrane, in order to facilitate the thermocompression bonding with electrode catalyst layers, is evaporated by the heat for thermally transferring the electrode catalyst layers, causing shrinkage of the polymer electrolyte membrane.

The polymer electrolyte membrane contains the solvent in an amount from about 1 to 30% by weight of the total membrane, and so the membrane swells and is easily softened by heating, facilitating the thermocompression bonding with electrode catalyst layers. Therefore, the polymer electrolyte membrane, after formed by a casting method, is dried in an oven or the like to contain the solvent in an amount within the above-described range. Alternatively, the polymer electrolyte membrane, after dried in the oven or the like, is immersed in a solvent such as ethanol or methanol, or is sprayed with the solvent to contain the solvent in an amount within the above-described range.

The inventors have further continued investigation based upon the above-described knowledge. As a result, it has been found that excellent dimensional stability can be provided by reducing the amount of the solvent contained in the polymer electrolyte membrane below the predetermined range, to suppress the shrinkage of the polymer electrolyte membrane when the electrode catalyst layers are thermally transferred.

Thus, the method for manufacturing an electrode structure of the present invention comprises a method for manufacturing an electrode structure for a polymer electrolyte fuel cell comprising a pair of electrode catalyst layers containing carbon particles supporting platinum particles as a catalyst and a polymer electrolyte membrane sandwiched between the electrode catalyst layers, wherein the polymer electrolyte membrane is made of a sulfonated polyarylene-based polymer, comprising the steps of: forming a polymer electrolyte membrane from a solution of a sulfonated polyarylene-based polymer; coating a catalyst paste containing catalyst particles in which platinum particles are supported on carbon particles and a polymer electrolyte on a sheet-like support and drying the same to form an electrode catalyst layer; and thermally transferring to join said electrode catalyst layer to both sides of the polymer electrolyte membrane containing a solvent in the range of 0.5% or less by weight of the total membrane.

According to the manufacturing method of the present invention, in the step of thermally transferring the electrode catalyst layer, the polymer electrolyte membrane contains a solvent in an amount in the range of 0.5% or less by weight of the total membrane. Consequently, as for the electrode structure obtained in the manufacturing method of the present invention, the amount of the solvent that evaporates from the polymer electrolyte membrane when the electrode catalyst layer is thermally transferred is extremely small, so that the shrinkage of the polymer electrolyte membrane can be suppressed to obtain excellent dimensional stability.

In the step of thermally transferring the electrode catalyst layer, when the polymer electrolyte membrane contains a solvent in an amount more than 0.5% by weight of the total membrane, the shrinkage of the polymer electrolyte membrane due to the evaporation of the solvent from the polymer electrolyte membrane cannot be suppressed.

Moreover, the polymer electrolyte fuel cell needs to be subjected to the treatment (aging) for stabilizing the potential by actually operating the cell to discharge the solvent contained in the polymer electrolyte membrane, after forming the polymer electrolyte fuel cell from the electrode structure. The electrode structure obtained by the manufacturing method of the present invention contains extremely reduced amount of the solvent contained in the polymer electrolyte membrane to 0.5% or less by weight of the total membrane as described above, so that the time required for the aging can be extremely reduced when the polymer electrolyte fuel cell is formed.

Moreover, the present invention also resides in a polymer electrolyte fuel cell comprising the electrode structure for a polymer electrolyte fuel cell. The polymer electrolyte fuel cell of the present invention can be used, for example, as a power source, a backup power source and the like for an electrical apparatus such as a personal computer and a cellular phone. In addition, the polymer electrolyte fuel cell of the present invention canal so be used, for example, as a power for a transport apparatus such as a vehicle and a ship such as a submarine.

BRIEF DESCRIPTION OF THE DRAWINGS

FIGS. 2(a) to 2(f) are manufacturing process views schematically showing a method for manufacturing an electrode structure for a polymer electrolyte fuel cell of the present invention;

DETAILED DESCRIPTION OF THE PREFERRED EMBODIMENTS

The embodiments of the present invention will now be described further in detail with reference to the attached drawings.

Figure 1:
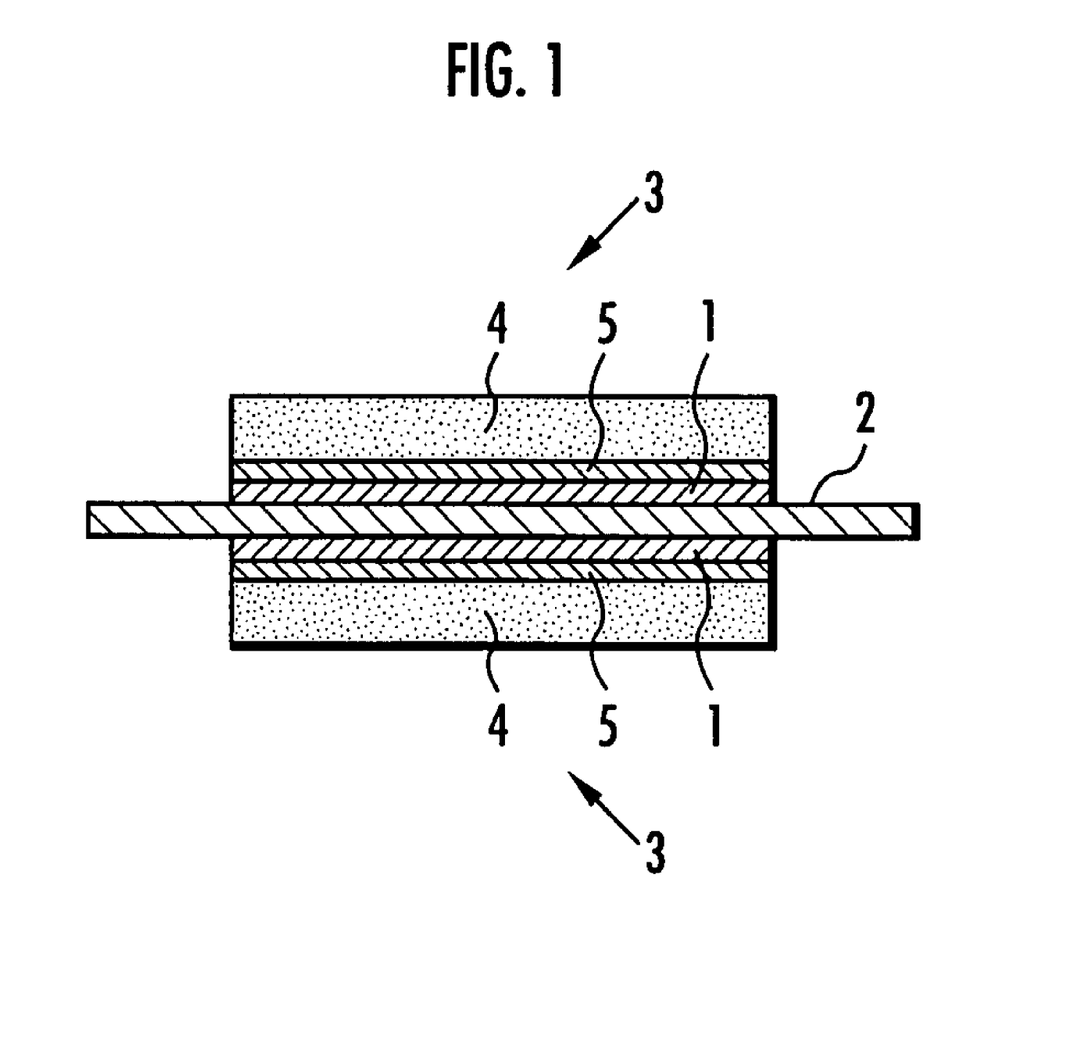
FIG. 1 is an illustrative sectional view showing one example of an electrode structure for a polymer electrolyte fuel cell of the present invention.

The electrode structure of the present embodiment consists of a pair of electrode catalyst layers 1, 1, a polymer electrolyte membrane 2 sandwiched by the electrode catalyst layers 1, 1 and diffusion layers 3, 3 laminated on each of the electrode catalyst layers 1, 1. The diffusion layer 3 consists of a carbon paper 4 and a primary coat 5 formed on one side of the carbon paper 4, and is laminated on the electrode catalyst layer 1 through the primary coat 5.

The electrode catalyst layer 1 consists of catalyst particles in which platinum particles are supported on carbon particles and an ion conducting binder. As the ion conducting binder, polymer electrolytes such as the above-described perfluoro-alkylenesulfonic acid polymer compound (e.g., Nafion (trade name) made by E.I. du Pont de Nemours and Company) and a sulfonated polyarylene-based polymer are used.

The polymer electrolyte membrane 2 is made of a sulfonated polyarylene-based polymer, which has an ion exchange capacity in the range of 1.7 to 2.3 meq/g. In addition, the sulfonated polyarylene-based polymer to be used contains a component insoluble in N-methylpyrrolidone in an amount of 70% or less relative to the total amount of the polymer, after the polymer is subjected to heat treatment for exposing it under a constant temperature atmosphere of 120° C. for 200 hours.

The sulfonated polyarylene-based polymers in which, when the ion exchange capacity is in the above-described range, the content of the insoluble component after the heat treatment is brought into the above-described range, may include, for example, a sulfonated product of a copolymer represented by formula (1) or a copolymer represented by formula (2):

(1)

(2)

The copolymer represented by formula (1) can be obtained by copolymerizing a monomer represented by formula (3) with an oligomer represented by formula (4):

The method for manufacturing an electrode structure of the present embodiment will now be described with reference to FIGS. 2(a) to 2(f).

(3)

(4)

The copolymer represented by formula (1) can be sulfonated by reacting with concentrated sulfuric acid to introduce a sulfonic acid group to a benzene ring that is not adjacent to an electron attracting group.

Further, the copolymer represented by formula (2) can be obtained by copolymerizing a monomer represented by formula (5) with the oligomer represented by formula (4), and then by hydrolyzing a sulfonate ester group ($-SO_3CH(CH_3)C_2H_5$) to form a sulfonic acid group ($-SO_3H$).

(5)

The diffusion layer 3 consists of, for example, a carbon paper 4 and a primary coat 5 formed on the carbon paper 4. The primary coat 5 to be used includes a mixture prepared by mixing, for example, carbon black with polytetrafluoroethylene (PTFE) particles in a weight ratio of carbon black:PTFE=4:6.

In the method for manufacturing the electrode structure of present invention, as the sulfonated polyarylene-based polymer, the sulfonated product of the copolymer represented by formula (1) or the copolymer represented by formula (2) is first dissolved in N-methylpyrrolidone to prepare a polymer electrolyte solution. Next, a membrane is cast from the polymer electrolyte solution by a casting method and dried in an oven to form a polymer electrolyte membrane 2 shown in FIG. 2(a). The polymer electrolyte membrane 2 has a dry thickness of 40 μm and contains 0.5% or less by weight of a solvent relative to the total weight of the membrane.

Next, platinum particles are supported on carbon black (furnace black), for example, in a weight ratio of carbon black:platinum particles=1:1 to prepare catalyst particles. Then, the catalyst particles are uniformly dispersed in a perfluoroalkylenesulfonic acid polymer compound (e.g., Nafion (trade name) made by E.I. du Pont de Nemours and Company) solution as an ion conducting polymer binder solution, for example, in a weight ratio of catalyst particles:ion conducting polymer binder=2:1 to prepare a catalyst paste.

Next, the catalyst paste is screen-printed on a polyethylene terephthalate film 6 shown in FIG. 2(b) and then dried to form an electrode catalyst layer 1. Then, as shown in FIG. 2(c), the polymer electrolyte membrane 2 is sandwiched by a pair of electrode catalyst layers 1, 1, and hot-pressed from above the polyethylene terephthalate films 6.

The hot-pressing is performed, for example, at a temperature in the range of 80 to 160° C. under application of a surface pressure in the range of 1 to 10 MPa for 1 to 60 minutes. As a result, the electrode catalyst layer 1 is transferred to the polymer electrolyte membrane 2 to be joined with the polymer electrolyte membrane 2. Then, removal of the polyethylene terephthalate film 6 provides a structure 7 in which the polymer electrolyte membrane 2 is sandwiched by a pair of electrode catalyst layers 1, 1, as shown in FIG. 2(*d*).

Figure 2:
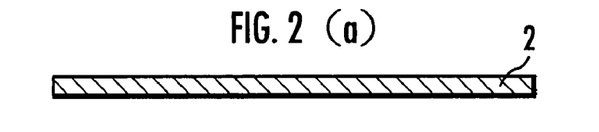

Next, a slurry, in which a mixture obtained by mixing carbon black with polytetrafluoroethylene (PTFE) particles, for example, in a weight ratio of 1:1 is uniformly dispersed in ethylene glycol, is coated on one of the surfaces of the carbon paper 4 shown in FIG. 2(*e*) and then dried to form a primary coat 5, forming a diffusion layer 3 consisting of the carbon paper 4 and the primary coat 5.

Next, as shown in FIG. 2(*f*), the structure 7 is sandwiched by a pair of the diffusion layers 3,3 on the sides with the primary coats 5, 5 and hot-pressed from above the carbon papers 4. The hot-pressing is performed, for example, at a temperature in the range of 100 to 180° C. under application of a surface pressure in the range of 10 to 100 MPa for 1 to 60 minutes. As a result, the diffusion layer 3 is joined to the electrode catalyst layer 1 through the primary coat 5 to provide the electrode structure 8 comprising the structure in which the structure 7 is sandwiched between the diffusion layers 3, 3.

In the electrode structure 8, a reducing gas such as hydrogen and methanol is introduced into the electrode catalyst layer 1 through the diffusion layer 3 for the fuel electrode (anode) side, and an oxidizing gas such as air and oxygen is introduced into the electrode catalyst layer 1 through the diffusion layer 3 for the oxygen electrode (cathode) side. On the fuel electrode side, protons and electrons are produced from the reducing gas by the action of the catalyst contained in the electrode catalyst layer 1. The protons move to the electrode catalyst layer 1 on the oxygen electrode side through the polymer electrolyte membrane 2, and react with the oxidizing gas and electrons introduced into the catalyst layer 1, to form water by the action of the catalyst contained in the electrode catalyst layer 1. Therefore, a circuit for sending the electrons produced in the fuel electrode to the oxygen electrode is formed by connecting the fuel electrode to the oxygen electrode through a lead wire, and current can be taken out. Thus, the electrode structure 8 can be used as a fuel cell.

The examples and comparative examples of the present invention will now be shown.

Example 1

In the present example, firstly, into a 1 liter, three-necked flask equipped with a stirrer, a thermometer, a condenser, a Dean-Stark tube, and a three-way cock for introducing nitrogen, 67.3 g (0.20 mole) of 2,2-bis(4-hydroxypheny)-1,1,1,3,3,3-hexafluoropropane (bisphenolAF), 53.5 g (0.214 mole) of 4,4'-dichlorobenzophenone, 34.6 g (0.251 mole) of potassium carbonate, 300 ml of N,N-dimethylacetamide and 150 ml of toluene were charged, heated under nitrogen atmosphere in an oil bath and reacted at 130° C. while stirring. The reaction was carried out while the water produced by the reaction was azeotropically distilled with toluene and removed to the outside of the system through the Dean-Stark tube. Production of water almost stopped in about 3 hours, and then most of the toluene was removed by increasing the reaction temperature slowly from 130° C. to 150° C. After continued the reaction for 10 hours at 150° C., 3.3 g (0.0133 mole) of 4,4'-dichlorobenzophenone was added and further reacted for 5 hours.

After the resultant reaction solution was cooled in air, a by-product that is a precipitate of an inorganic compound was removed by filtration and the filtrate was added into 4 liter of methanol. A precipitated product was filtered, recovered, dried, and then dissolved in 300 ml of tetrahydrofuran. The resultant solution was reprecipitated with 4 liter of methanol, obtaining 98 g of an oligomer (yield 93%) represented by formula (4):

(4)

Next, 28.4 g (2.87 mmol) of the oligomer represented by formula (4), 29.2 g (67.1 mmol) of 2,5-dichloro-4'-(4-phenoxy)phenoxybenzophenone, 1.37 g (2.1 mmol) of bis(triphenylphosphine) nickeldichloride, 1.36 g (9.07 mmol) of sodiumiodide, 7.34 g (28.0 mmol) of triphenylphosphine, and 11.0 parts by weight (168 mmol) of zinc powder were charged into a flask and substituted with dry nitrogen. Then, the mixture was added with 130 ml of N-methyl-2-pyrrolidone, heated to 80° C. and subjected to polymerization for 4 hours while stirring. A polymer solution was diluted with tetrahydrofuran, and a polymer was recovered by coagulating with hydrochloric acid/methanol. The recovered product was repeatedly washed with methanol and dissolved in tetrahydrofuran. It was purified by reprecipitation with methanol, and the polymer that was obtained by filtration was vacuum-dried, to obtain 5.07 g of a polyarylene-based polymer (yield 96%) represented by formula (1):

(1)

Next, the polyarylene-based polymer represented by formula (1) was added with concentrated sulfuric acid to be sulfonated so as to have an ion exchange capacity of 1.7 meq/g, preparing a sulfonated polyarylene-based polymer.

Next, the sulfonated polyarylene-based polymer was dissolved in N-methylpyrrolidone to prepare a polymer electrolyte solution, from which the polymer electrolyte membrane 2 having a dry thickness of 35 μm shown in FIG. 2(a) was prepared by a casting method. The polymer electrolyte membrane 2 was found to contain 0.5% or less by weight of a solvent relative to the total weight of the membrane.

Next, platinum particles were supported on carbon black (furnace black) in a weight ratio of platinum particles:carbon black particles=1:1 to prepare catalyst particles. Then, the catalyst particles were uniformly dispersed in a perfluoroalkylenesulfonic acid polymer compound (e.g., Nafion (trade name) made by E.I. du Pont de Nemours and Company) solution as an ion conducting polymer binder solution, in a weight ratio of catalyst particles:ion conducting polymer binder=5:7, to prepare a catalyst paste.

Next, the catalyst paste was screen-printed on a polyethylene terephthalate film 6, as shown in FIG. 2(b), and then dried to form an electrode catalyst layer 1. Then, as shown in FIG. 2(c), the polymer electrolyte membrane 2 was sandwiched between a pair of electrode catalyst layers 1, 1, and hot-pressed from above the polyethylene terephthalate film 6 at 160° C. and 4 MPa for 10 minutes, transferring the electrode catalyst layer 1 to the polymer electrolyte membrane 2. After the hot-pressing, removal of the polyethylene terephthalate film 6 provided a structure 7 in which both sides of the polymer electrolyte membrane 2 were joined with the electrode catalyst layers 1, 1, as shown in FIG. 2(d).

Next, a slurry, in which a mixture obtained by mixing carbon black with polytetrafluoroethylene (PTFE) particles in a weight ratio of 4:6 is uniformly dispersed in ethylene glycol, was coated on one of the surfaces of the carbon paper 4 and dried to form a primary coat 5, forming a diffusion layer 3 consisting of the carbon paper 4 and the primary coat 5, as shown in FIG. 2(e).

Next, as shown in FIG. 2(f), the structure 7 was sandwiched by a pair of the diffusion layers 3,3 on the sides with the primary coats 5,5 and hot-pressed from above the carbon papers 4 at 140° C. and 3 MPa for 5 minutes. As a result, the diffusion layer 3 was joined to the electrode catalyst layer 1 through the primary coat 5 to provide the electrode structure 8 comprising the structure in which the structure 7 is sandwiched between the diffusion layers 3, 3.

Next, the content of the insoluble component in the polyarylene-based polymer in the polymer electrolyte membrane 2 obtained in the present example was determined, and the power generation performance of the electrode structure 8 obtained in the present example was evaluated.

As for the determination of the content of the insoluble component in the polyarylene-based polymer, the polymer electrolyte membrane 2 was subjected to the heat treatment for exposing it under a constant temperature atmosphere of 120° C. for 200 hours, and then the elution curves from gel permeation chromatographs were determined for an untreated polymer electrolyte membrane 2 and for the polymer electrolyte membrane 2 after subjected to the above-described heat treatment. Then, the content of the insoluble component in the polyarylene-based polymer was calculated from the ratio of the areas for the above-described elution curves, wherein the area of the elution curve for the untreated polymer electrolyte membrane 2 was defined as 100.

The gel permeation chromatographs were determined by the HLC-8020 (trade name) made by Tosoh Corporation using a refractive index detector. As columns, two pieces of ShodexKD-806M (trade name) made by Showa Denko K.K. were used, and one piece of ShodexKD-G (trade name) made by Showa Denko K.K. was used as a pre-column. N-methylpyrrolidone (1 st grade reagent, containing 50 mmol/l of lithium chloride and 50 mmol/l of phosphoric acid) was used as a solvent, with a flow rate of 1.0 ml/minute. The temperatures were set at 40° C. for all of the column part, the inlet part and the detection part. Samples were filtered with a 0.5 μn polytetrafluoroethylene filter; the concentration was set at 0.3% by weight; and the feed volume was set at 0.3 ml.

As a result, for the polymer electrolyte membrane 2 obtained in the present example, the content of the insoluble component in the polyarylene-based polymer was 15% by weight.

Next, the electrode structure 8 obtained in the present example was used to evaluate power generation performance, under the power generation conditions of a temperature of 95° C., a relative humidity for the fuel electrode side of 35% and a relative humidity for the oxygen electrode side of 65%. The results are shown in Table 1. Cell potentials at a current density of 0.5 A/cm² were measured. When the cell potential was 0.4V or higher, the power generation performance was defined as good and indicated as [Good] in Table 1, and it was defined as poor when the cell potential was lower than 0.4V and indicated as [Poor] in Table 1.

Further, the service life was measured until the cross-leak occurred between the fuel electrode side and the oxygen electrode side when the power was generated under the above-described conditions. The results are also shown in Table 1.

Example 2

In the present example, the electrode structure 8 was manufactured exactly the same way as in Example 1 except that the polyarylene-based polymer represented by formula (1) was sulfonated so as to have an ion exchange capacity of 2.0 meq/g to prepare a sulfonated polyarylene-based polymer.

Next, the content of a component insoluble in N-methylpyrrolidone in the polyarylene-based polymer in the polymer electrolyte membrane 2 obtained in the present example was determined exactly the same way as in Example 1. For the polymer electrolyte membrane 2 obtained in the present example, the content of the insoluble component in the polyarylene-based polymer was 35% by weight.

Next, power generation performance was evaluated and the above-described service life was measured, exactly the same way as in Example 1, using the electrode structure 8 obtained in the present example. The results are shown in Table 1.

Example 3

In the present example, the electrode structure 8 was manufactured exactly the same way as Example 1 except that the polyarylene-based polymer represented by formula (1) was sulfonated so as to have an ion exchange capacity of 2.3 meq/g to prepare a sulfonated polyarylene-based polymer.

Next, the content of a component insoluble in N-methylpyrrolidone in the polyarylene-based polymer in the polymer electrolyte membrane 2 obtained in the present example was determined exactly the same way as in Example 1. For the polymer electrolyte membrane 2 obtained in the present example, the content of the insoluble component in the polyarylene-based polymer was 56% by weight.

Next, power generation performance was evaluated and the above-described service life was measured, exactly the same way as in Example 1, using the electrode structure 8 obtained in the present example. The results are shown in Table 1.

Comparative Example 1

In the present comparative example, the electrode structure 8 was manufactured exactly the same way as in Example 1 except that the polyarylene-based polymer represented by formula (1) was sulfonated so as to have an ion exchange capacity of 1.5 meq/g to prepare a sulfonated polyarylene-based polymer.

Next, the content of a component insoluble in N-methylpyrrolidone in the polyarylene-based polymer in the polymer electrolyte membrane 2 obtained in the present comparative example was determined exactly the same way as in Example 1. For the polymer electrolyte membrane 2 obtained in the present comparative example, the content of the insoluble component in the polyarylene-based polymer was zero.

Next, power generation performance was evaluated, exactly the same way as in Example 1, using the electrode structure 8 obtained in the present example. As the power generation performance was poor, the above-described service life was not measured. The results are shown in Table 1.

Comparative Example 2

In the present comparative example, the electrode structure 8 was manufactured exactly the same way as in Example 1 except that the polyarylene-based polymer represented by formula (1) was sulfonated so as to have an ion exchange capacity of 2.4 meq/g to prepare a sulfonated polyarylene-based polymer.

Next, the content of a component insoluble in N-methylpyrrolidone in the polyarylene-based polymer in the polymer electrolyte membrane 2 obtained in the present comparative example was determined exactly the same way as in Example 1. For the polymer electrolyte membrane 2 obtained in the present comparative example, the content of the insoluble component in the polyarylene-based polymer was 75% by weight.

Next, power generation performance was evaluated and the above-described service life was measured, exactly the same way as in Example 1, using the electrode structure 8 obtained in the present example. The results are shown in Table 1.

Comparative Example 3

In the present comparative example, the electrode structure 8 was manufactured exactly the same way as in Example 1 except that the polyarylene-based polymer represented by formula (1) was sulfonated so as to have an ion exchange capacity of 2.5 meq/g to prepare a sulfonated polyarylene-based polymer.

Next, the content of a component insoluble in N-methylpyrrolidone in the polyarylene-based polymer in the polymer electrolyte membrane 2 obtained in the present comparative example was determined exactly the same way as in Example 1. For the polymer electrolyte membrane 2 obtained in the present comparative example, the content of the insoluble component in the polyarylene-based polymer was 78% by weight.

Next, power generation performance was evaluated and service life was measured, exactly the same way as Example 1, using the electrode structure 8 obtained in the present example. The results are shown in Table 1.

TABLE 1

| | Ion exchange capacity (meq/g) | Content of insoluble component (wt %) | Power generation performance | Service life (hr) |
|---|---|---|---|---|
| Comparative Example 1 | 1.5 | 0 | Poor | — |
| Example 1 | 1.7 | 15 | Good | 1100 |
| Example 2 | 2.0 | 35 | Good | 950 |
| Example 3 | 2.3 | 56 | Good | 800 |
| Comparative Example 2 | 2.4 | 75 | Good | 400 |
| Comparative Example 3 | 2.5 | 78 | Good | 200 |

It is apparent from Table 1 that an ion exchange capacity of less than 1.7 meq/g (Comparative Example 1) cannot provide sufficient power generation performance. On the other hand, it is apparent that an ion exchange capacity of 1.7 meq/g or more can provide excellent power generation performance.

Moreover, it is apparent that, when the ion exchange capacity is in the range of 1.7 to 2.3 meq/g and the content of an insoluble component in the polyarylene-based polymer is 70% by weight or less (Examples 1 to 3), the service life is much longer and has excellent durability to the heat during the operation of the fuel cell in addition to the excellent power generation performance, compared with the case where the ion exchange capacity is more than 2.3 meq/g and the content of an insoluble component in the polyarylene-based polymer is more than 70% by weight (Comparative Examples 2 and 3).

Example 4 and Comparative Example 4

Next, the above-described structures 7 were manufactured so that the content of the solvent in the polymer electrolyte membrane 2 relative to the total membrane is each 0.1%, 0.3%, 0.5%, 1.0% and 5.0%, by weight, when the electrode catalyst layer 1 is thermally transferred to the side of the polymer electrolyte membrane 2. Then, the dimensional change ratio when the electrode structure 8 was composed from each structure 7 was determined. The results are shown in FIG. 3.

Figure 3:
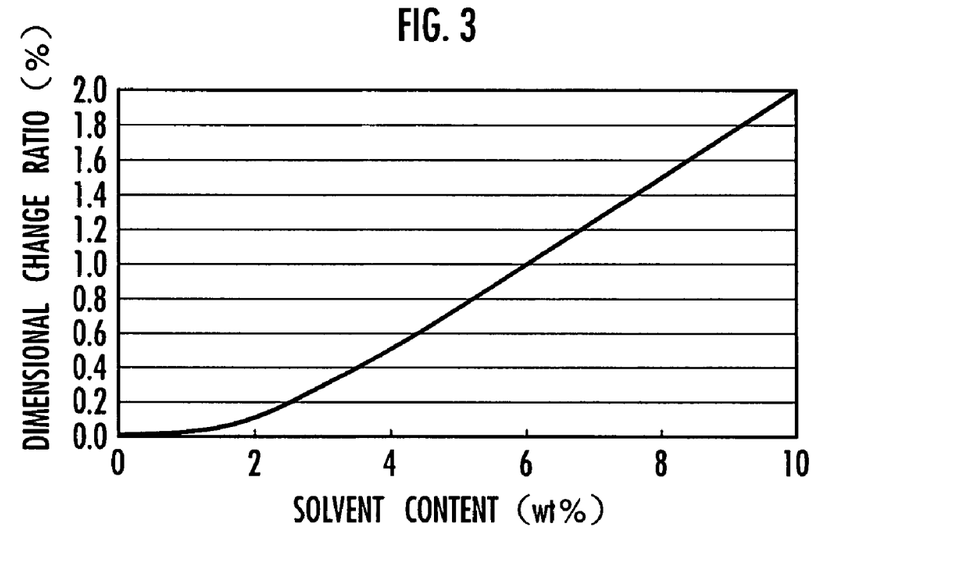
FIG. 3 is a graphical representation showing the relation of the solvent content in a polymer electrolyte membrane to the dimensional change ratio.

It is apparent from FIG. 3 that, when the content of the solvent in the polymer electrolyte membrane 2 relative to the total membrane is in the range of 0.1 to 0.5% by weight (Example 4), no change in dimensions of the electrode structure 8 was observed. On the other hand, it is apparent that, when the content of the solvent is 1.0% and 5.0% by weight (Comparative Example 4), that is, higher than 0.5% by weight, the dimensional change ratio is large and it increases as the increase of the solvent content.

Next, the polymer electrolyte fuel cell composed of the electrode structures 8 manufactured so that the content of the solvent in the polymer electrolyte membrane 2 relative to the total membrane is 0.5% by weight when the electrode catalyst layer 1 is thermally transferred to the side of the polymer electrolyte membrane 2 (Example 4), and the polymer electrolyte fuel cell composed of the electrode structure 8 manufactured so that the solvent content is 5.0% by weight (Comparative Example 4) were operated, and the time until the potential becomes constant (time required for aging) was measured. The results are shown in FIG. 4.

Figure 4:
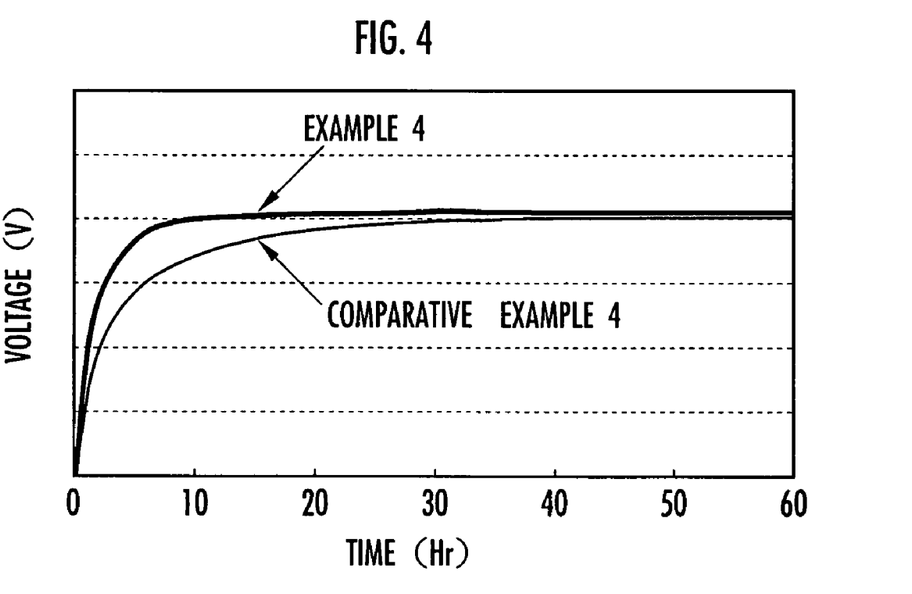
FIG. 4 is a graphical representation showing the change of voltage with time when a polymer electrolyte fuel cell composed using an electrode structure for a polymer electrolyte fuel cell obtained by a manufacturing method of the present invention is subjected to aging.

It is apparent from FIG. 4 that, although it takes about 30 hours until the potential becomes constant for the polymer electrolyte fuel cell of Comparative Example 4, it takes only eleven hour for the polymer electrolyte fuel cell of Example 4, so that the time required for aging was extremely reduced.

What is claimed is:

1. An electrode structure for a polymer electrolyte fuel cell comprising a pair of electrode catalyst layers containing carbon particles supporting platinum particles as a catalyst and a polymer electrolyte membrane sandwiched between the electrode catalyst layers, wherein said polymer electrolyte membrane is made of a sulfonated polyarylene-based polymer, wherein said sulfonated polyarylene-based polymer is a copolymer represented by formula (2):

(2)

wherein m, l, and n are numbers;
said sulfonated polyarylene-based polymer has an ion exchange capacity in the range of 1.7 to 2.3 meq/g; and
said polymer contains a component insoluble in N-methylpyrrolidone in an amount of 70% or less relative to the total amount of the polymer, after said polymer is subjected to heat treatment for exposing the same under a constant temperature atmosphere of 120° C. for 200 hours.

2. A polymer electrolyte fuel cell comprising an electrode structure for a polymer electrolyte fuel cell comprising a pair of electrode catalyst layers containing carbon particles supporting platinum particles as a catalyst and a polymer electrolyte membrane sandwiched between the electrode catalyst layers, wherein said polymer electrolyte membrane is made of a sulfonated polyarylene-based polymer, wherein said sulfonated polyarylene-based polymer is a copolymer represented by formula (2):

(2)

wherein m, l, and n are numbers;
said sulfonated polyarylene-based polymer has an ion exchange capacity in the range of 1.7 to 2.3 meq/g; and
said polymer contains a component insoluble in N-methylpyrrolidone in an amount of 70% or less relative to the total amount of the polymer, after said polymer is subjected to heat treatment for exposing the same under a constant temperature atmosphere of 120° C. for 200 hours.

* * * * *